United States Patent
Hasegawa et al.

(10) Patent No.: US 6,778,314 B2
(45) Date of Patent: Aug. 17, 2004

(54) PHASE MODULATOR AND PHASE MODULATING METHOD

(75) Inventors: Toshio Hasegawa, Tokyo (JP); Tsuyoshi Nishioka, Tokyo (JP); Hirokazu Ishizuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/380,044

(22) PCT Filed: Sep. 7, 2001

(86) PCT No.: PCT/JP01/07770
§ 371 (c)(1),
(2), (4) Date: Mar. 11, 2003

(87) PCT Pub. No.: WO02/23800
PCT Pub. Date: Mar. 21, 2002

(65) Prior Publication Data
US 2003/0184840 A1 Oct. 2, 2003

(30) Foreign Application Priority Data
Sep. 11, 2000 (JP) .................................... 2000-274360

(51) Int. Cl.[7] .............................................. H04L 9/38
(52) U.S. Cl. ....................... 359/279; 380/256; 380/263
(58) Field of Search ................................. 359/279, 238, 359/11; 380/256, 263

(56) References Cited

U.S. PATENT DOCUMENTS 6,522,749 B2 * 2/2003 Wang ........................ 380/263

FOREIGN PATENT DOCUMENTS

| JP | 2-46422 A | 2/1990 |
| JP | 7-131419 A | 5/1995 |
| JP | 9-61771 A | 3/1997 |
| JP | 9-96845 A | 4/1997 |
| WO | 98/10560 A1 | 3/1998 |

OTHER PUBLICATIONS

Uchiyama, Kabushiki Kaisha Science, vol. 34, No. 12, pp. 53–61 (1996).

Merolla et al., Optics Letters, vol. 24, No. 2, pp. 104–106 (1999).

Jean–Marc Merolla et al., "Phase–modulation transmission system for quantum cryptography", Optics Letters, vol. 24, No. 2, Jan. 15, 1999, pp.104–106.

Chikako Uchiyama et al., "Basics of Quantum Mechanics and Quantum Cryptography—Viewpoint of Quantum Communication Channel", vol. 34, No. 12, Kabushiki Kaisha Science, Dec. 1, 1996, pp. 53–61.

* cited by examiner

*Primary Examiner*—Scott J. Sugarman
*Assistant Examiner*—Richard Hanig
(74) *Attorney, Agent, or Firm*—Birch, Stewart, Kolasch & Birch, LLP

(57) ABSTRACT

In case of the high-speed operation, it is difficult to ignore the time required for the voltage to rise to the level of voltage to be applied and the time to fall to 0V when the voltage is applied to the phase modulator. The first phase modulator 71 and the second phase modulator 73 are connected in parallel, and the optical path is switched by the switching unit 55 of the control unit 51 between the first optical switch 33 and the second optical switch 35. The switching unit 55 of the control unit 51 supplies the phase modulation data 31 stored in the phase modulation data memory 53 to the first voltage generating unit 57 or the second voltage generating unit 59 to generate the voltage necessary for the phase modulation.

11 Claims, 15 Drawing Sheets

PHASE MODULATOR AND PHASE MODULATING METHOD

This application is the national phase under 35 U.S.C. §371 of PCT International Application No. PCT/JP01/07770 which has an International filing date of Sep. 7, 2001, which designated the United States of America.

TECHNICAL FIELD

The present invention relates to a phase modulation apparatus and a phase modulation method for performing a phase modulation on an optical signal at a high speed. For example, the invention relates to a high-speed modulation apparatus and its method for quantum cryptography of phase modulation system.

BACKGROUND ART

FIGS. 14 and 15 show a method for phase modulation in the conventional quantum cryptography of phase modulation system disclosed in a document: Uchiyama, "Basic quantum mechanics and quantum cryptography" Mathematical Sciences No. 402, December 1996.

According to the cryptography of phase modulation system, a phase modulator (PM) is usually placed as shown in a configuration of FIG. 14. A transmitting apparatus and a receiving apparatus include phase modulators (PMA, PMB), respectively, and apply voltage corresponding to the phase modulation (0, π/2, π, 3π/2) to the phase modulators.

The quantum cryptography of phase modulation system physically creates the system utilizing interference of photons having different phases which flow through two kinds of optical paths having the same length in an optical system using such as an optical fiber. In the modulation of the quantum cryptography of phase modulation system, each of the transmitting apparatus and the receiving apparatus usually includes one phase modulator and operate phase modulation between the two partners.

The following explains concretely the conventional method for phase modulation in the quantum cryptography of phase modulation system using one example.

For example, an embodiment of B92 protocol using a coupler at a joint where an optical fiber is used will be explained referring to FIGS. 14 and 15.

A photon is oscillated from laser at a certain cyclic frequency, and transmits to a coupler 1 as an optical signal through the optical fiber, etc. Hereinafter, only two optical paths will be explained, which are critical to the quantum cryptography.

The first one is a first optical path in which, at a coupler 1, the laser goes upwards in FIG. 14, passes through the phase modulator PMA and a coupler 2, and at a coupler 3, the laser goes forward without passing through a phase modulator PMB and passes through a coupler 4 to reach a detector.

The second one is a second optical path in which at the coupler 1, the laser goes forward without passing through the phase modulator PMA and passes through the coupler 2, and at the coupler 3, the laser goes upwards in FIG. 14, passes through the phase modulator PMB, passes through the coupler 4 to reach the detector.

The first optical path has the same length as the second optical path.

When it is assumed that one phase as Φa which modulated by the phase modulator PMA, and the other as Φb which modulated by the phase modulator PMB, between the optical paths having the same length, an optical interference occurs according to a difference value of (Φa−Φb). The quantum cryptography of the phase modulation system utilizes this interference. As described, the conventional method for modulating the phase simply places one phase modulator in each of the transmitting device and the receiving device to perform desired phase modulation.

For example, in order to modulate phases of 0, π/2, π, or 3π/2, voltages of 0V, 4V, 8V, or 12V are applied to the phase modulator. As shown in FIG. 15, upon applying the voltage, there always exist a rise time LP and a fall time TP of the voltage. Further, when one phase modulator continuously modulates different random phases serially, a blank period BP (BP>0) should be provided.

In the conventional phase modulation method, the modulation requires to apply voltages in different values at a high speed, however, the rise time LP and the fall time TP of voltage prevents a high-speed operation. For example, when a photon is oscillated at a certain cyclic frequency using a pulse laser, the phase should be modulated synchronously with the timing of oscillating the photon, and therefore, various kinds of voltages corresponding to the modulation amount should be applied synchronously with the above timing. A bit rate of the quantum cryptography is in proportion with the number of frequency of the pulse laser, so that the voltage should be switched to a high voltage and applied to the phase modulator to perform the high-speed operation. Because of this, generally, long LP and TP cause to extend the time required for applying the voltage different from the previous value. Ignoring this fact, if the cyclic frequency (of the pulse laser, for example) is raised, BP becomes hard to be taken (BP≦0), the next timing of the voltage to rise and the previous timing of the voltage to fall are overlapped, which causes malfunction of the modulator and, therefore, prevents the high-speed operation.

The present invention aims to perform a high-speed processing of the phase modulation. The objectives of the invention are to improve a bit rate, namely, the high-speed operation in, for example, the quantum cryptography of the phase interference system.

DISCLOSURE OF THE INVENTION

According to the present invention, a phase modulation apparatus includes:

N phase modulators (N: an integer equal to or greater than 2) for performing a phase modulation on an optical signal which flows through an optical path;

a first optical switch and a second optical switch for selectively connecting one of the N phase modulators which are placed parallel to the optical path; and a control unit for outputting a switching signal to the first optical switch and the second optical switch and making the one of the N phase modulators connect to the optical path.

The control unit includes:

a phase modulation data memory for storing phase modulation data;

N voltage generating units each of which generates a voltage corresponding to each of the phase modulation to the N phase modulators; and a switching unit for serially reading the phase modulation data stored in the phase modulation data memory and serially supplying the phase modulation data read to the voltage generating unit for generating the voltage to the phase modulator to be connected to the optical path by the first optical switch and the second optical switch.

The control unit includes:
- a phase modulation data memory for storing phase modulation data having N values;
- a voltage generating unit for generating N fixed voltages corresponding to the N values of the phase modulation data, and for supplying the N fixed voltages to the N phase modulators, respectively; and
- a switching unit for reading the phase modulation data stored in the phase modulation data memory, and outputting the switching signal for selecting one of the N phase modulators, to which the voltage corresponding to a value of the phase modulation data read is supplied, to the first optical switch and the second optical switch.

According to the present invention, a phase modulation apparatus includes:
- N phase modulators (N: an integer equal to or greater than 2) which are connected serially to an optical path; and
- a control unit for generating N voltages to the N phase modulators so that a sum of the N voltages applied to the N phase modulators becomes a voltage corresponding to a phase modulation of an optical signal, and supplying the N voltages to the N phase modulators.

The control unit includes:
- a phase modulation data memory for storing phase modulation data; and
- a voltage generating unit for generating N equal voltages (V/N) by equally dividing a voltage V, which corresponds to the phase modulation data stored in the phase modulation data memory, by N, and supplying the N equal voltages (V/N) generated to the N phase modulators, respectively.

According to the present invention, a phase modulation method for serially performing a phase modulation on a first optical signal and a second optical signal, the phase modulation method includes:
- a first modulation step for phase modulating the first optical signal by a first phase modulator; and
- a second modulation step for phase modulating the second optical signal by a second phase modulator before the first modulation step terminates.

According to the present invention, a phase modulation method for performing a phase modulation on an optical signal by a predetermined amount includes:
- a first modulation step for phase modulating the optical signal by a first phase modulator; and
- a second modulation step for phase modulating the optical signal, which is phase modulated by the first modulation step, by a second phase modulator, and
- the phase modulation method performs the phase modulation on the optical signal by the predetermined amount with performing both the first modulation step and the second modulation step.

PREFERRED EMBODIMENTS FOR CARRYING OUT THE INVENTION

Embodiment 1

According to the first embodiment, in the quantum cryptography using the phase modulation method, a high-speed modulation method of the quantum cryptography of phase modulation system will be explained, in which multiple parallel phase modulators are provided and switched at a high speed by an optical switch.

Figure 1:
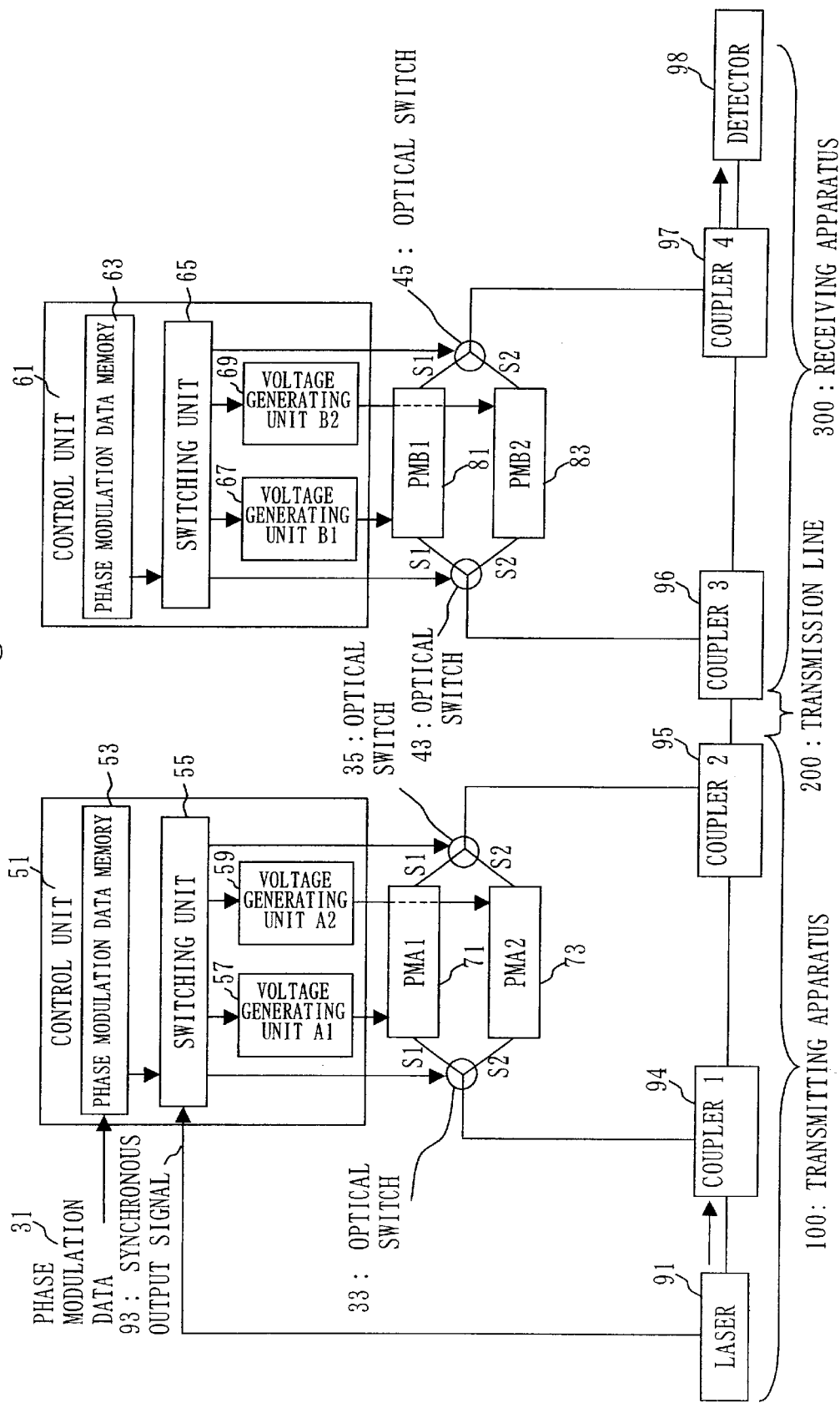
FIG. 1 shows a phase modulation apparatus according to the first embodiment.

FIG. 1 shows a high-speed modulation system in the quantum cryptography of the phase modulation system.

This modulation system is configured by a transmitting apparatus 100, a transmission line 200, and a receiving apparatus 300. In the transmitting apparatus 100, laser 91 oscillates optical signals with a cyclic frequency C to continuously generate the optical signals. A first coupler 94 and a second coupler 95 make the optical signal diverge and converge. A first phase modulator 71 and a second phase modulator 73 perform a phase modulation on the optical signal. A first optical switch 33 and a second optical switch 35 switch the operations of the first phase modulator 71 and the second phase modulator 73. A synchronous output signal 93 is output from the laser 91 to a switching unit 55.

A control unit 51 controls the phase modulation. The control unit 51 includes a phase modulation data memory 53, the switching unit 55, a first voltage generating unit 57, and a second voltage generating unit 59. The phase modulation data memory 53 inputs and stores phase modulation data 31. When the synchronous output signal 93 is output from the laser 91, the switching unit 55 switches the first optical switch 33 and the second optical switch 35 alternately so as to switch to use the first phase modulator 71 and the second phase modulator 73 in turn. And further, based on a value of the phase modulation data 31 stored in the phase modulation data memory 53, the switching unit 55 instructs the first voltage generating unit 57 and the second voltage generating unit 59 to generate voltage used for the phase modulation by the first phase modulator 71 and the second phase modulator 73. The first voltage generating unit 57 generates a phase voltage to the first phase modulator 71, and the second voltage generating unit 59 generates the voltage for the phase modulation to the second phase modulator 73.

The transmission line 200 is a transmission line made of optical fiber, etc.

The receiving apparatus 300 is configured in the same manner with the transmitting apparatus 100. Different from the transmitting apparatus 100, the receiving apparatus 300 doesn't have the laser 91 like the transmitting apparatus 100, but includes a detector 98. The detector 98 detects an optical interference.

Figure 2:
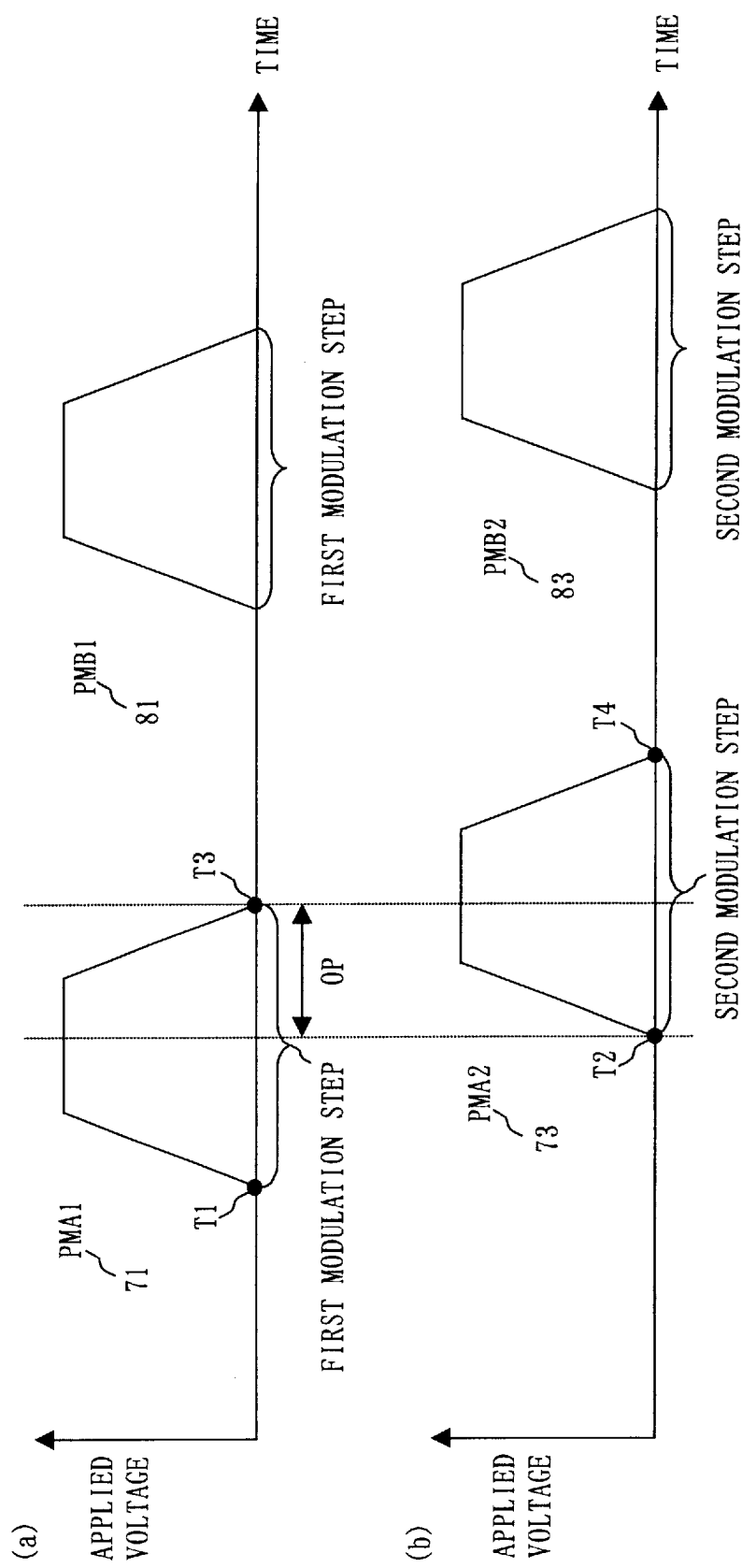
FIG. 2 explains the operation of the phase modulation apparatus of the first embodiment.

FIG. 2 shows the operation of the first phase modulator 71, the second phase modulator 73, the first phase modulator 81, and the second phase modulator 83.

In FIG. 2, (a) shows a voltage applied to the first optical signal, and (b) shows a voltage applied to the second optical signal.

As shown in FIG. 2, the operating time of the first phase modulator 71 overlaps with the operating time of the second phase modulator 73 by a period shown as OP. Namely, before a first modulation step in which the first phase modulator 71 performs the phase modulation on the first optical signal is finished, a second modulation step in which the second phase modulator 73 performs the phase modulation on the second optical signal is started. In this way, it is possible to have overlapped operating time OP between the first modulation step and the second modulation step, since the first phase modulator 71 and the second phase modulator 73 are connected in parallel.

Figure 3:
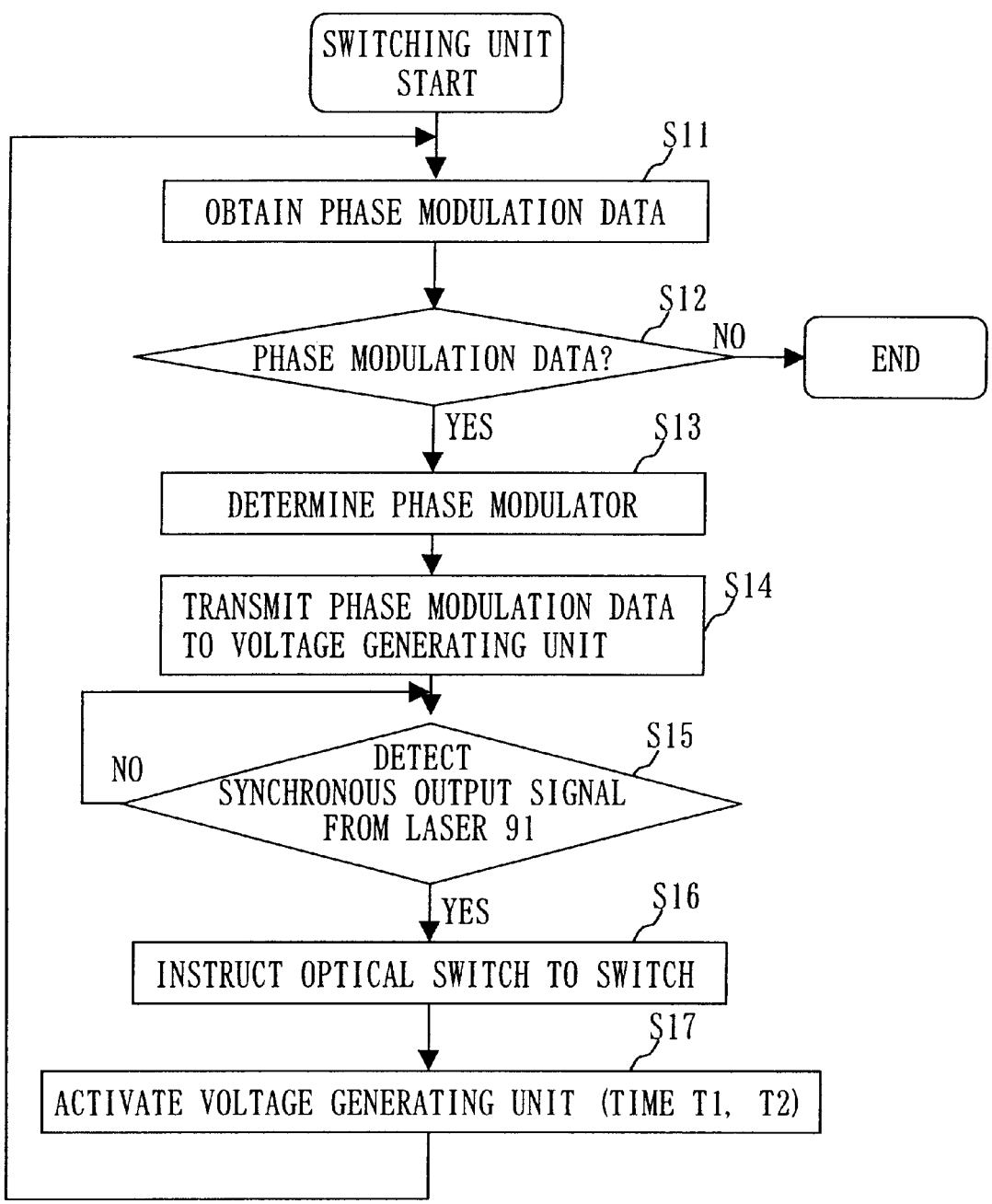
FIG. 3 shows an operational flowchart of a switching unit of the first embodiment.

FIG. 3 is a flowchart showing the operation of the switching unit 55 of the control unit 51.

First, the switching unit 55 obtains the phase modulation data 31 from the phase modulation data memory 53 serially at S11, and if there is no phase modulation data 31 at S12, the switching unit 55 finishes the phase modulation process. Next, at S13, the switching unit 55 determines which of the first phase modulator 71 and the second phase modulator 73 is used for the phase modulation of the next optical signal. In this case, the first phase modulator 71 and the second phase modulator 73 is used alternately. And in case that the first phase modulator 71 is used at S14, the phase modulation data 31 is transmitted to the first voltage generating unit 57. On the other hand, in case that the second phase modulator 73 is used at S14, the phase modulation data 31 is transmitted to the second voltage generating unit 59. Then, at S15, the synchronous output signal 93 from the laser 91 is awaited. When the synchronous output signal 93 arrives from the laser 91, the switching unit 55 switches the first optical switch 33 and the second optical switch 35 to the first phase modulator 71 or the second phase modulator 73 at S16. At S17, the switching unit 55 transmits an activation signal for generating the voltage based on the phase modulation data 31 to the voltage generating unit which applies the voltage for the phase modulation to the phase modulator and connected by the first optical switch 33 and the second optical switch 35. As a result, the first voltage generating unit 57 or the second voltage generating unit 59 outputs the voltage based on the phase modulation data 31 to the first phase modulator 71 or the second phase modulator 73.

In FIG. 2, at the time T1, the first voltage generating unit 57 is activated, and the second voltage generating unit 59 is activated at the time T2.

As described, the phase modulation at twice the speed at maximum is enabled by connecting two phase modulators in parallel and switching the operations of the two phase modulators. And further, if N phase modulators are connected in parallel and their operations are switched, the phase modulation at N-time the speed at maximum is enabled.

Embodiment 2

Figure 4:
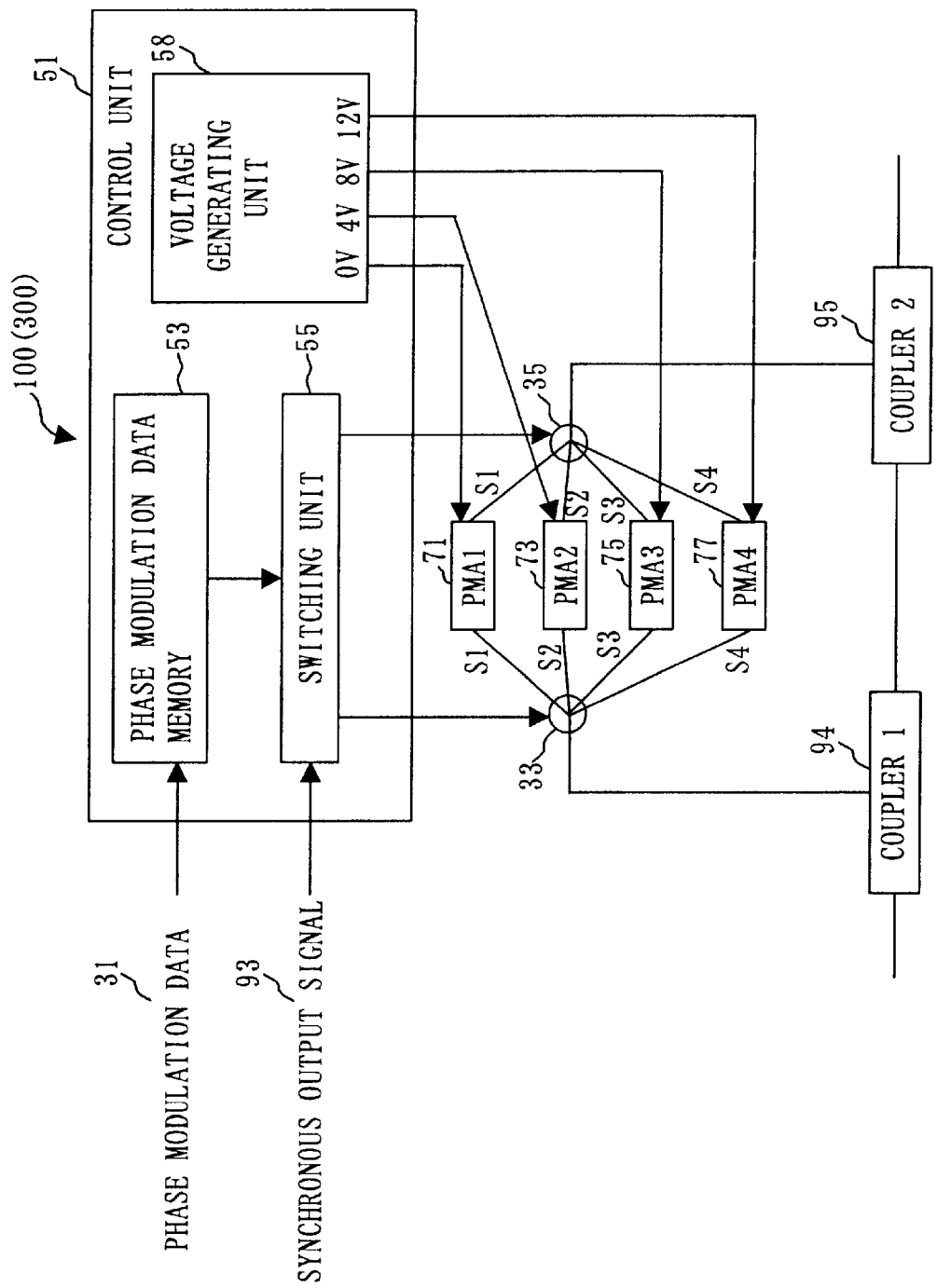
FIG. 4 shows a phase modulation apparatus according to the second embodiment.

FIG. 4 shows another example of the transmitting apparatus 100 (or the receiving apparatus 300).

In FIG. 4, four phase modulators of the first phase modulator 71, the second phase modulator 73, a third phase modulator 75, and a fourth phase modulator 77 are connected in parallel, and the operations are switched by the first optical switch 33 and the second optical switch 35. The voltage generating unit 58 always generates 0V, 4V, 8V, and 12V for the use of the phase modulation of four kinds of amount; 0, $\pi/2$, $\pi$, and $3\pi/2$. 0V is supplied to the first phase modulator 71, 4V is to the second phase modulator 73, 8V is to the third phase modulator 75, and 12V is to the fourth phase modulator 77.

Figure 5:
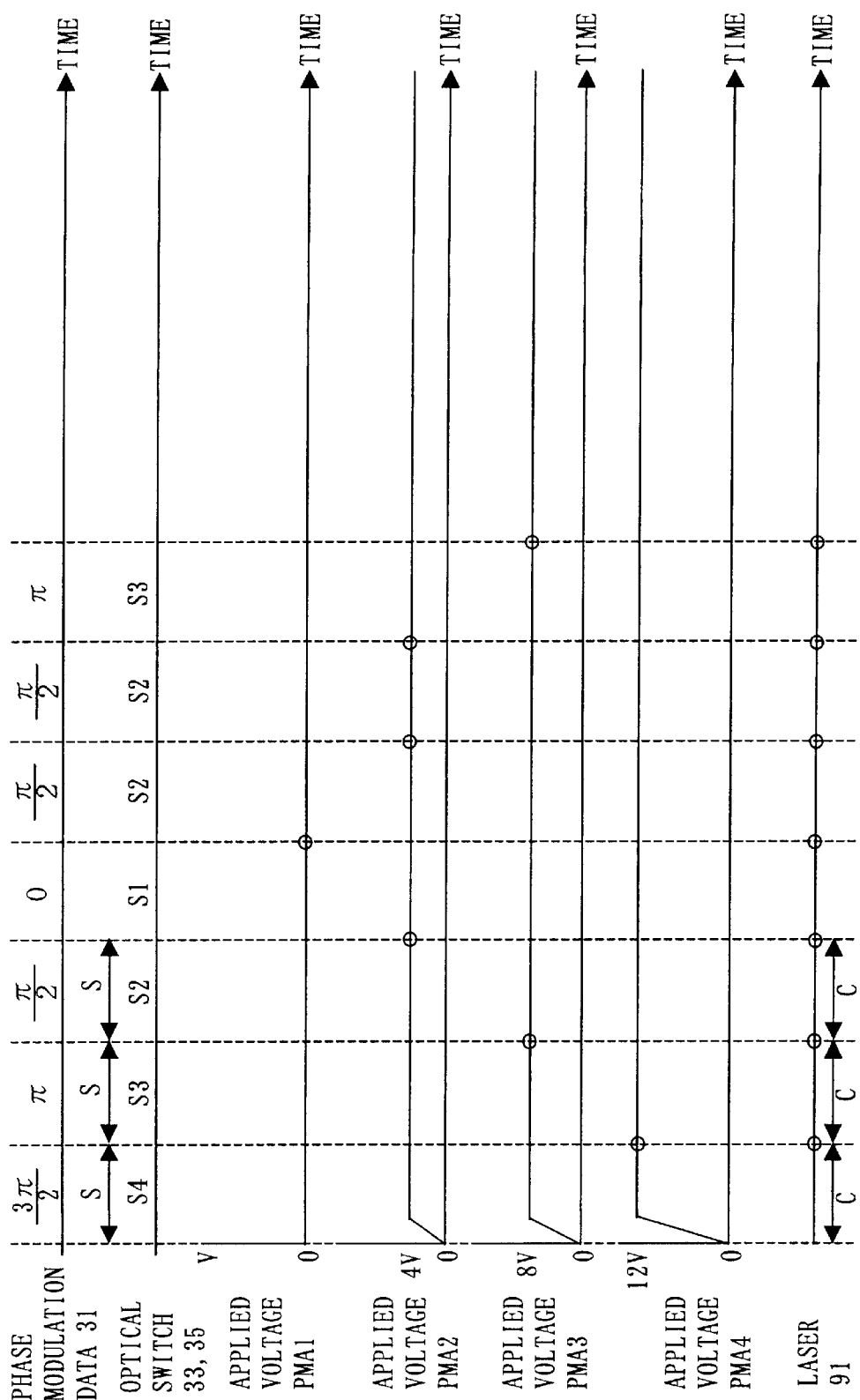
FIG. 5 explains the operation of the phase modulation apparatus of the second embodiment.

FIG. 5 explains the operations of the first phase modulator 71, the second phase modulator 73, the third phase modulator 75, and the fourth phase modulator 77 shown in FIG. 4.

The first phase modulator 71 always performs the phase modulation of 0V, the second phase modulator 73 always performs the one of 4V, the third phase modulator 75 always performs the one of 8V, and the fourth phase modulator 77 always performs the one of 12V. The switching unit 55 switches the first optical switch 33 and the second optical switch 35 based on the four values (0, $\pi/2$, $\pi$, and $3\pi/2$) of the phase modulation data 31 stored in the phase modulation data memory 53. For example, as shown in FIG. 5, when the phase modulation data 31 is $3\pi/2$, the switching unit 55 switches the first optical switch 33 and the second optical switch 35 to S4. Then, the first optical signal is phase modulated by the voltage of 12V. Next, when the phase modulation data 31 is $\pi$, the switching unit 55 switches the first optical switch 33 and the second optical switch 35 to S3, and the second optical signal is phase modulated by 8V.

Figure 6:
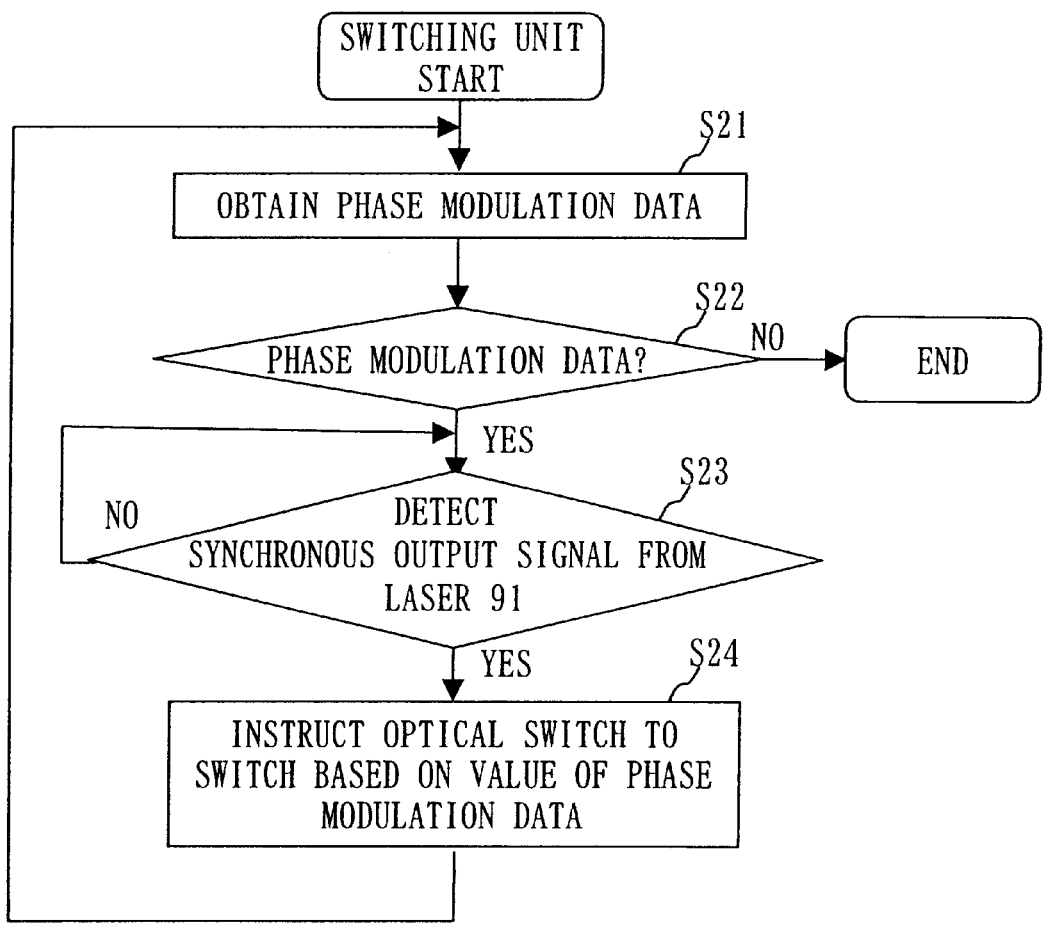
FIG. 6 shows an operational flowchart of a switching unit of the second embodiment.

FIG. 6 is a flowchart showing the operation of the switching unit 55 of the control unit 51 shown in FIG. 4.

First, at S21, the switching unit 55 obtains the phase modulation data 31 stored in the phase modulation data memory 53 serially. Next, at S22, the switching unit 55 finishes the phase modulation process if there is no phase modulation data 31. When there exists the phase modulation data 31, the switching unit 55 awaits the synchronous output signal 93 from the laser 91 at S23. When the synchronous output signal 93 is received from the laser 91, at S24, the switching unit 55 instructs to switch the first optical switch 33 and the second optical switch 35 based on the value of the phase modulation data 31.

In the present embodiment, each of the four phase modulators always performs one phase modulation (0, $\pi/2$, $\pi$, or $3\pi/2$), and the phase modulator is selected by the first optical switch 33 and the second optical switch 35. Accordingly, there is no need to consider the rise time and the fall time of the voltage, which enables a high-speed phase modulation.

In this embodiment, the time for switching the first optical switch 33 and the second optical switch 35 should be shorter by switching based on the cyclic frequency faster than the cyclic frequency C of the photon generated by the laser 91, which enables an extremely high-speed phase modulation.

Embodiment 3

According to the third embodiment, in the quantum cryptography employing the phase modulation system, another high-speed modulation system for the quantum cryptography of the phase modulation system will be explained, in which multiple series phase modulators are provided and the phase to be modulated is divided and modulated.

In this embodiment, another example of the transmitting apparatus 100 (or the receiving apparatus 300) will be discussed.

In this embodiment, a case in which the phase modulators are connected serially will be explained referring to FIG. 7.

Figure 7:
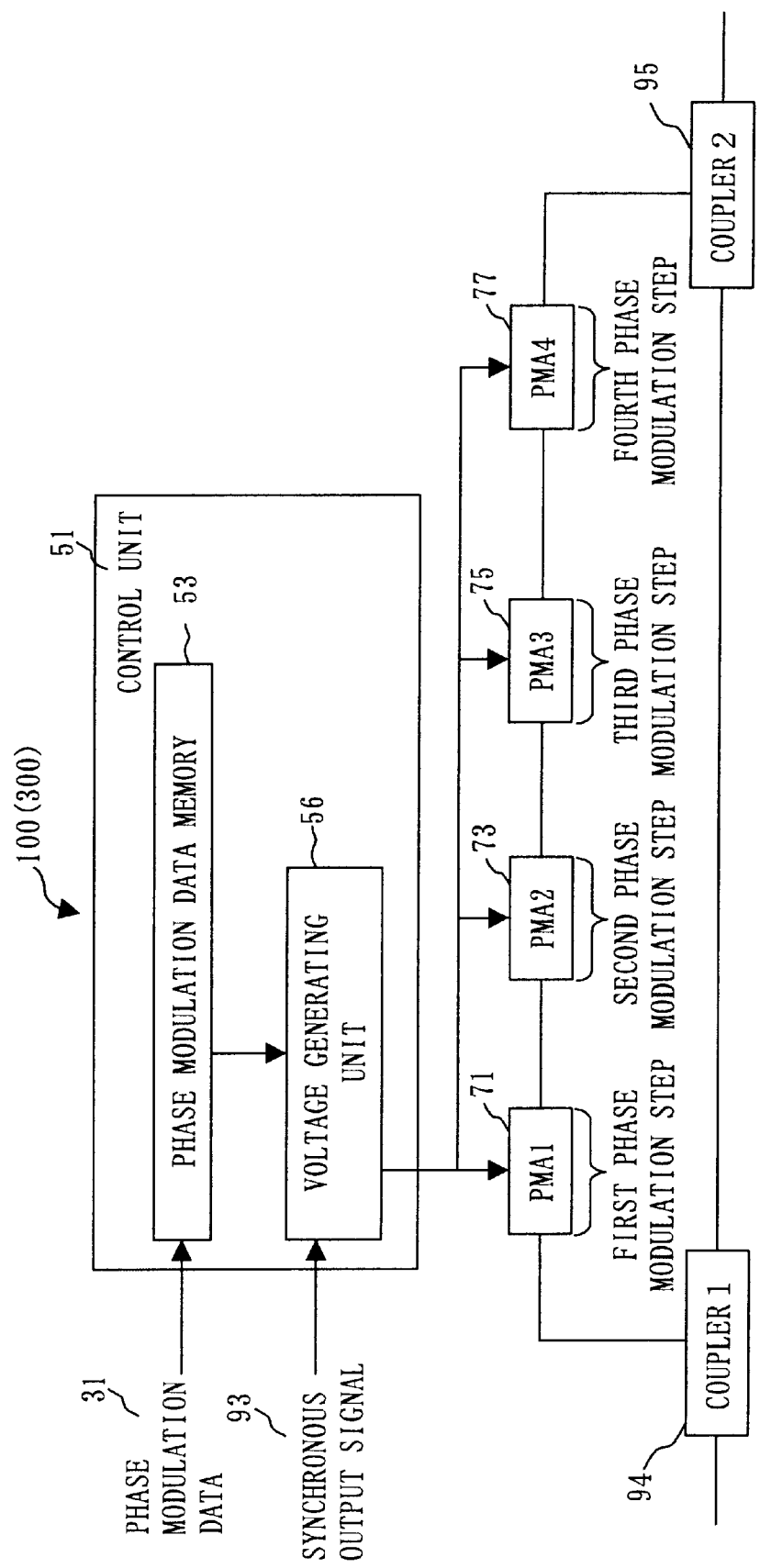
FIG. 7 shows a phase modulation apparatus according to the third embodiment.

In FIG. 7, the first phase modulator 71, the second phase modulator 73, the third phase modulator 75, and the fourth phase modulator 77 are serially connected. The voltage generating unit 56 generates the voltage of the same value to the four phase modulators and supplies the Voltages to the phase modulators at the same time.

Figure 8:
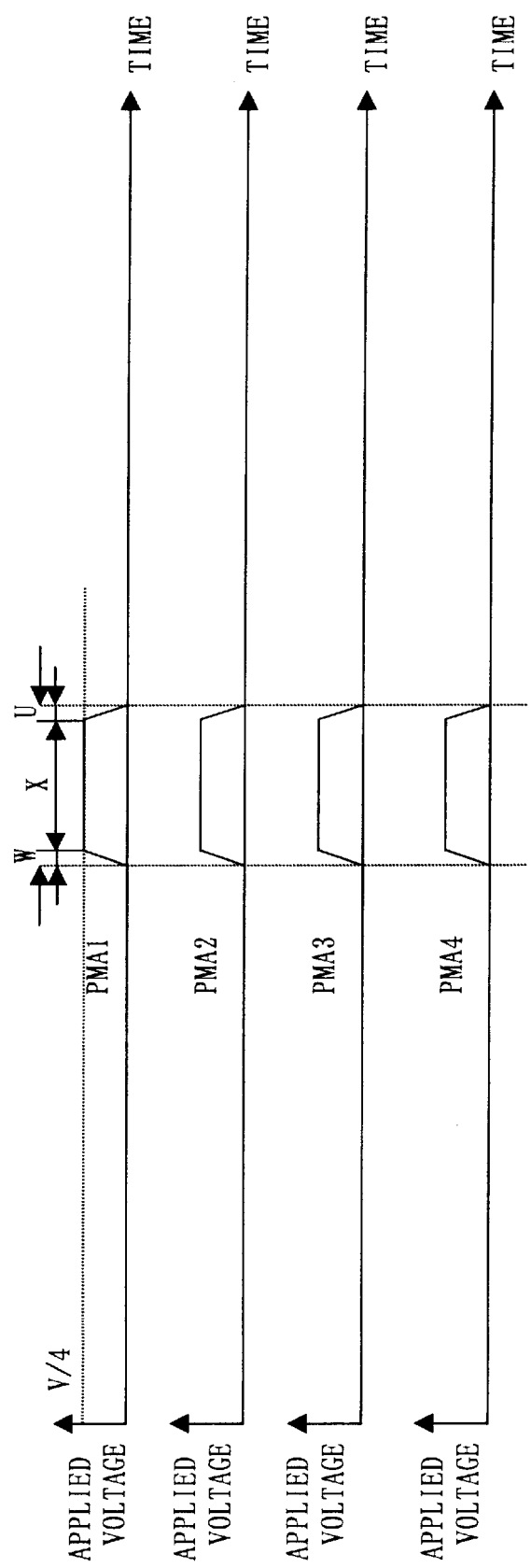
FIG. 8 explains the operation of the phase modulation apparatus of the third embodiment.

FIG. 8 shows applied voltages to the four phase modulators.

Figure 9:
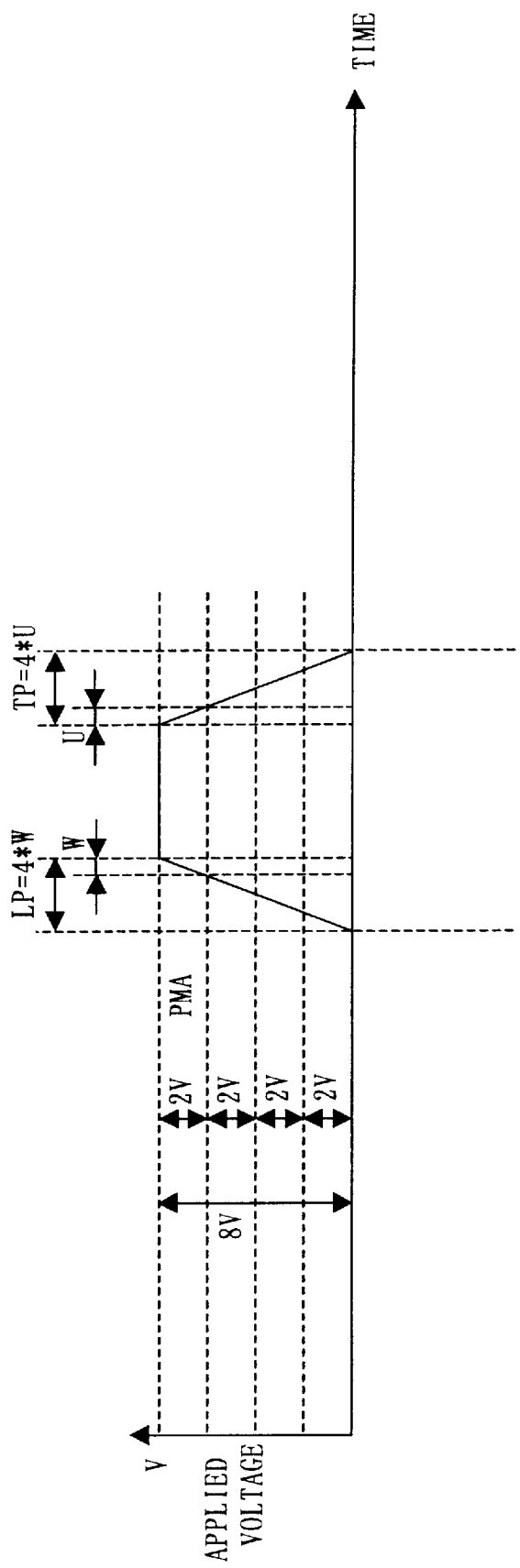
FIG. 9 shows a wave diagram of an applied voltage.

FIG. 9 shows the voltage V (V=8V) in case of performing the phase modulation of π.

In order to generate the voltage of 8V, it is assumed the rise time LP and the fall time TP are required. In case of the phase modulation, it is possible to apply the voltage of 8V at once to perform the phase modulation of π, and it is also possible to apply the voltage of 2V four times to perform the phase modulation of π. When it is assumed the rise time for generating the voltage of 2V as W and the fall time as U, W=LP/4 and U=TP/4, since the rise time and the fall time are in proportion with the voltage. Accordingly, the present embodiment shortens the rise time and the fall time required for generating the voltage to perform the phase modulation by applying the voltage to perform the phase modulation dividedly. For example, as shown in FIG. 7, in order to apply the voltage to be essentially applied using four phase modulators, each of the four phase modulators applies ¼ of the voltage. Therefore, the rise time and the fall time can be reduced to ¼.

In FIG. 8, the voltages of 2V are supplied to the four phase modulators at the same time. This is because it is possible to regard the time required for carrying the optical signal from the first phase modulator 71 through the fourth phase modulator 77 as almost 0, since the distance between the locations of the first phase modulator 71 and the fourth phase modulator 77 is short. If the time required for carrying the optical signal from the first phase modulator 71 through the fourth phase modulator 77 is too long to be ignored, the timings to supply the applied voltage to each phase modulator should be staggered a little.

Figure 10:
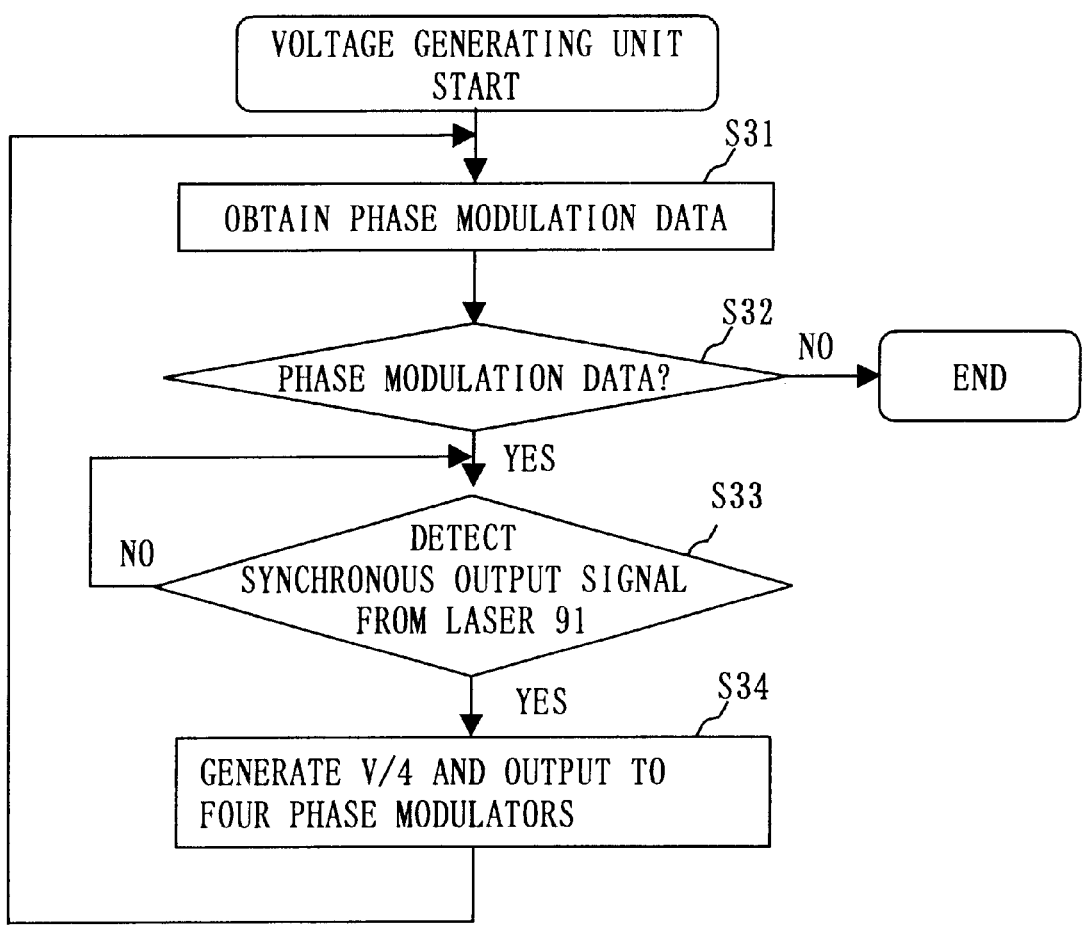
FIG. 10 shows an operational flowchart of a voltage generating unit of the third embodiment.

FIG. 10 is a flowchart showing the operation of the voltage generating unit 56 of the control unit 51.

The voltage generating unit 56 obtains the phase modulation data 31 from the phase modulation data memory 53 at S31. Next, if there is no phase modulation data 31, the voltage generating unit 56 finishes the phase modulation process at S32. Then, the voltage generating unit 56 awaits an input of the synchronous output signal 93 at S33. Further, at S34, the voltage generating unit 56 generates ¼ of the voltage (V/4) of the voltage V which is originally indicated by the phase modulation data 31 and outputs to the four phase modulators at the same time.

In the foregoing example, the voltage of 8V is divided into four.

When the applied voltage is 4V, the voltage of 1V is applied to each of the four phase modulators, and when the applied voltage is 12V, the voltage of 3V is applied to each of the four phase modulators.

According to the present embodiment, N phase modulators are connected serially, which can reduce the rise time and the fall time to 1/N, respectively.

In this embodiment, the first modulating step in which the optical signal is phase modulated by the first phase modulator 71, the second modulating step in which the optical signal that is phase modulated at the first modulating step is further phase modulated by the second phase modulator 73, and the third and the fourth modulating steps are provided. By executing these first through fourth modulating steps serially, a desired phase modulation of the predetermined amount can be performed. In this way, multiple phase modulators are connected serially and the modulated phase is divided and applied, so that the rise time and the fall time of the voltage are reduced, which enables a high-speed operation.

Figure 11:
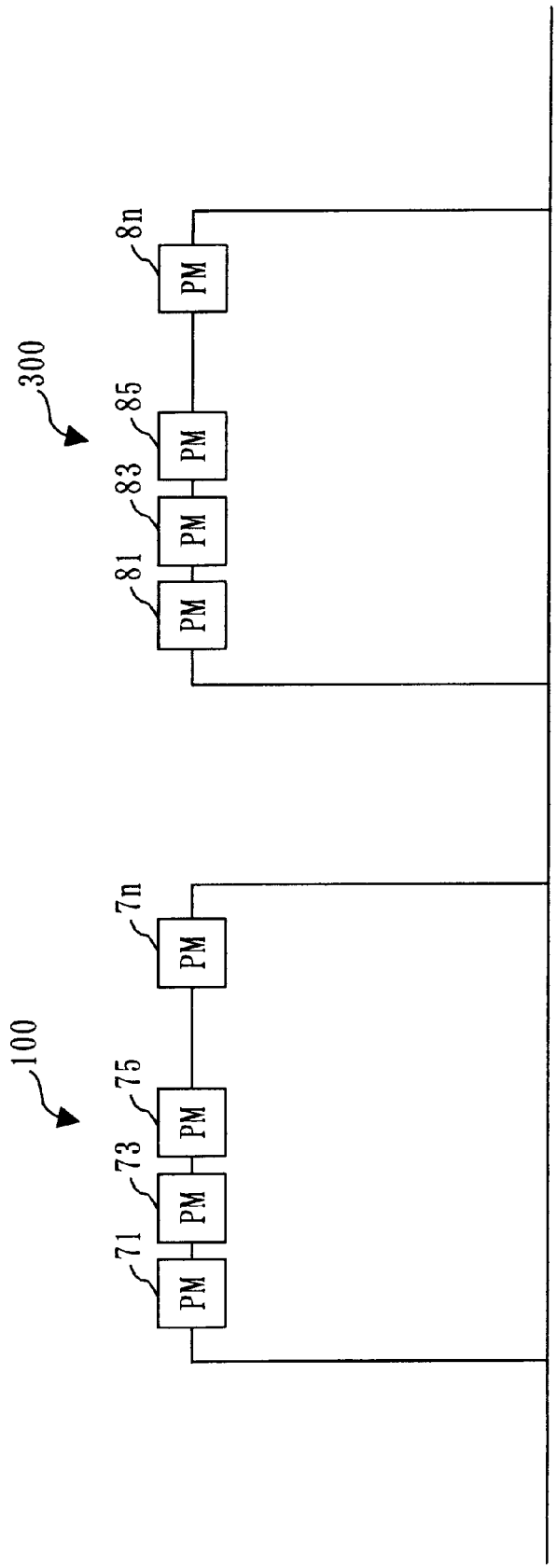
FIG. 11 shows another configuration showing a location of the phase modulation apparatus.
Figure 12:
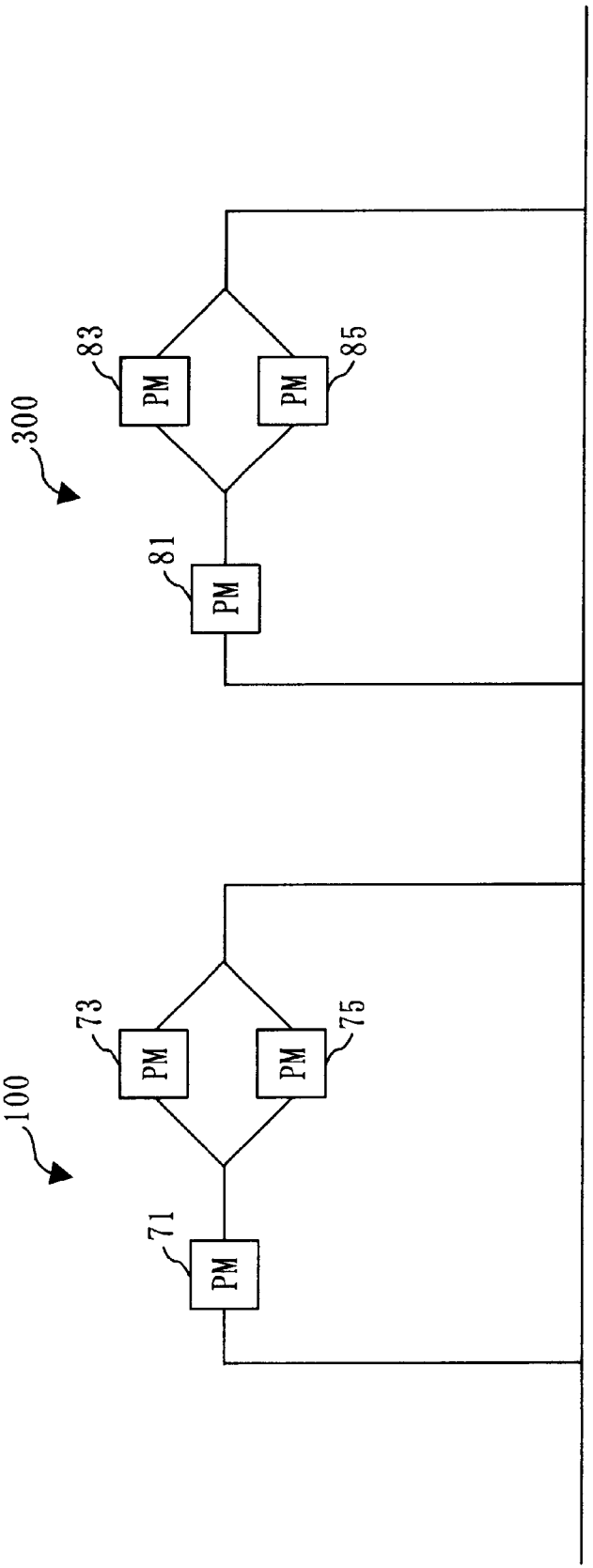
FIG. 12 shows another configuration showing a location of the phase modulation apparatus.
Figure 13:
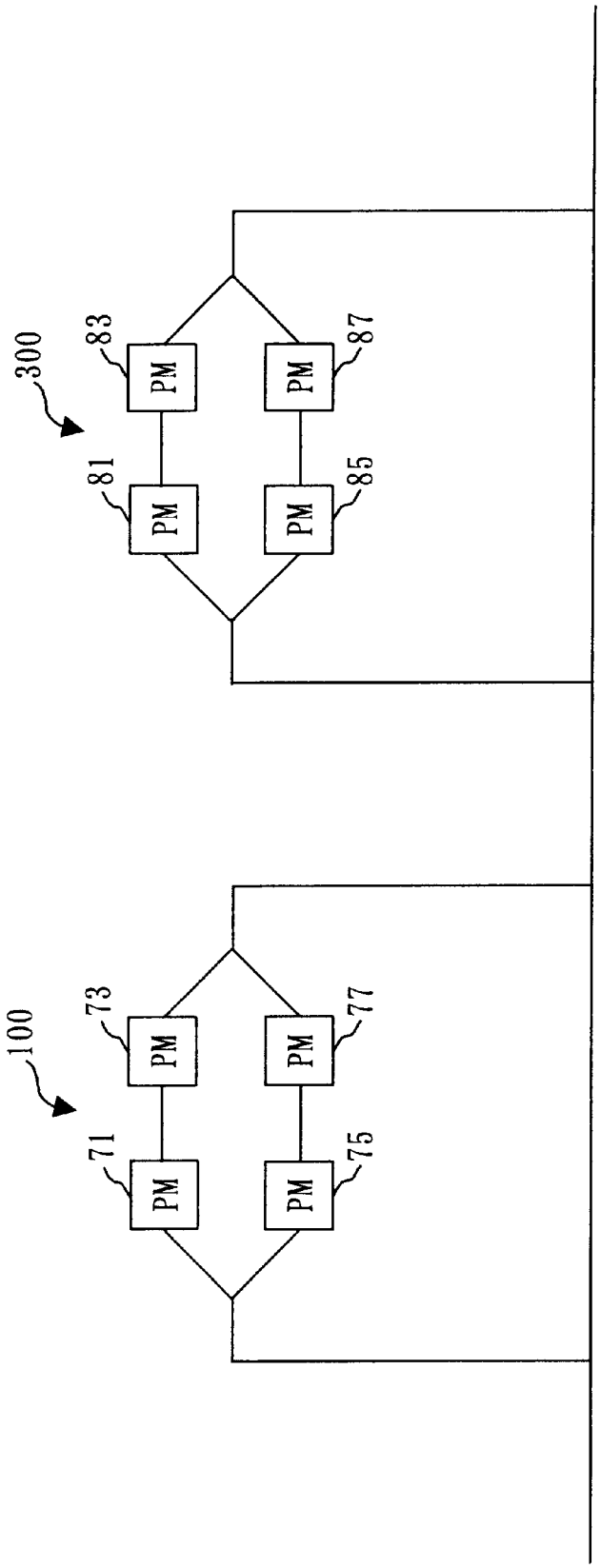
FIG. 13 shows another configuration showing a location of the phase modulation apparatus.
Figure 14:
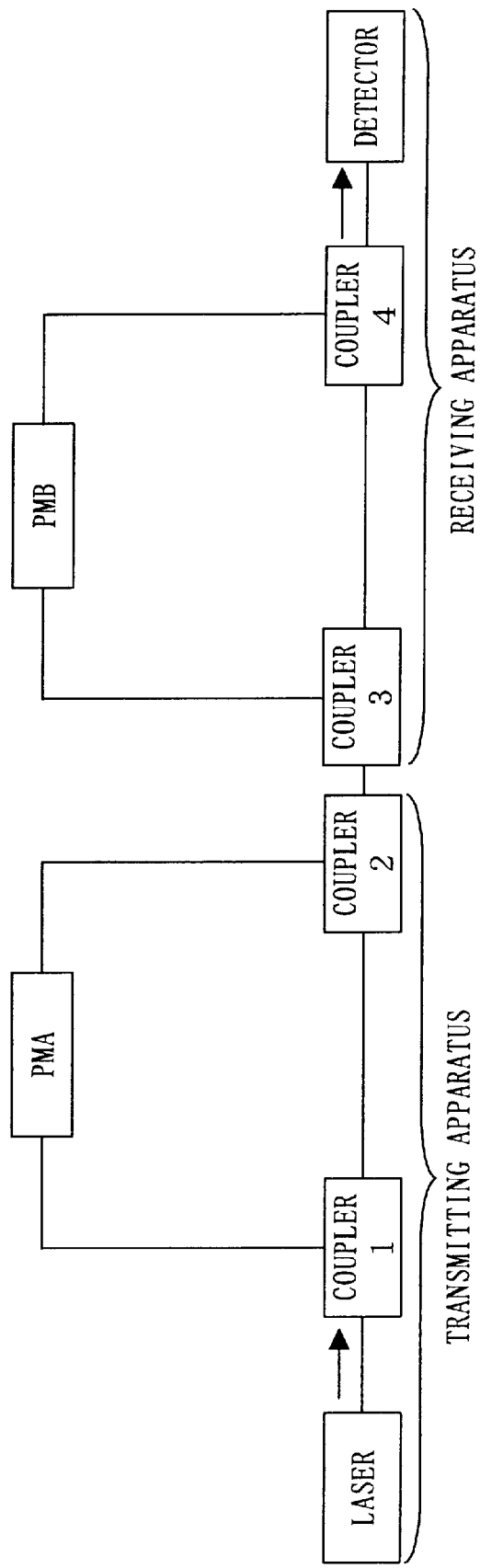
FIG. 14 shows a location of a conventional phase modulation apparatus.
Figure 15:
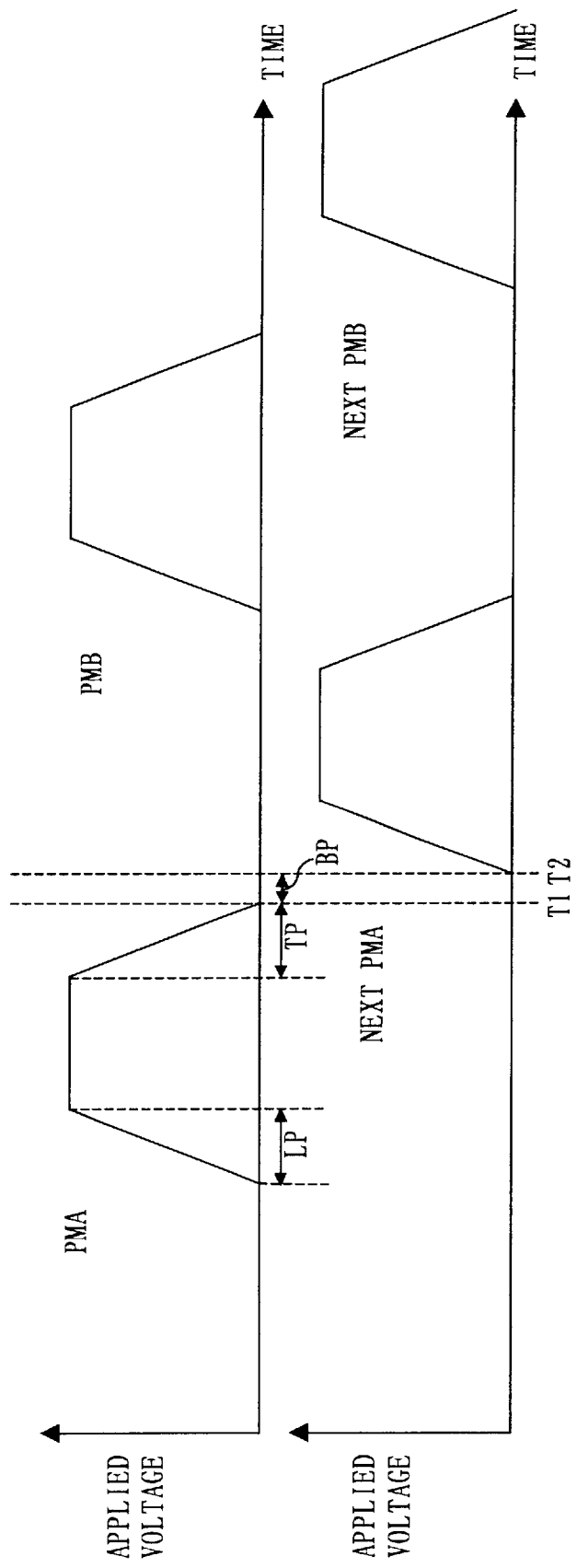
FIG. 15 explains the operation of the conventional phase modulation.

FIGS. 11 through 13 show examples of connecting the transmitting apparatus 100 and the receiving apparatus 300.

FIG. 11 shows a case in which N phase modulators are connected serially.

FIG. 12 shows a case in which the phase modulators are connected in serial and partially in parallel.

FIG. 13 shows a case in which the phase modulators are connected in parallel, and further connected in serial.

Another combination of the phase modulators can be also embodied, which is not illustrated here.

The above phase modulator can be used for the high-speed modulator in the quantum cryptography of the phase modulation system. And further, the application is not limited to the quantum cryptography, but the phase modulator can be also used for the phase modulation of the optical signal. Yet further, the above-described configuration can be used in only one of the transmitting apparatus and the receiving apparatus.

Industrial Applicability

As has been described, according to the preferred embodiment of the invention, the value of the bit rate can be increased in the quantum cryptography employing the phase modulation system. Namely, the high-speed operation can be done without the influence of the rise time and the fall time of the voltage to be applied for the phase modulation, or the influence of these time can be extremely reduced.

Further, according to the preferred embodiment of the invention, since the phase modulators are connected in parallel and switched, the phase modulation by another phase modulator can start the operation without awaiting until the voltage of the phase modulator in the process of the phase modulation is fallen to 0V, which enables the high-speed phase modulation.

According to the preferred embodiment of the invention, since a predetermined level of voltage is always applied to the phase modulator, and the optical signal is supplied to the phase modulator by switching with the switch, the rise time and the fall time of the voltage can be reduced to 0. Therefore, the high-speed phase modulation is enabled.

Yet further, according to the preferred embodiment of the invention, the phase modulators are connected serially, and the voltage is divided and applied. The rise time and the fall time of the voltage can be reduced, which enables the high-speed phase modulation.

What is claimed is:

1. A phase modulation apparatus comprising:

N phase modulators (N: an integer equal to or greater than 2) for serially performing a random phase modulation on a photon signal which flows through an optical path;

a first optical switch and a second optical switch for selectively connecting one of the N phase modulators which are placed parallel to the optical path; and a control unit for outputting a switching signal for each photon signal to the first optical switch and the second optical switch and making the one of the N phase modulators connect to the optical path.

2. The phase modulation apparatus of claim 1, wherein the control unit includes:

a phase modulation data memory for storing phase modulation data;

N voltage generating units each of which generates a voltage corresponding to each of the phase modulation to the N phase modulators;

a switching unit for serially reading the phase modulation data stored in the phase modulation data memory and serially supplying the phase modulation data read to the voltage generating unit for generating the voltage to the phase modulator to be connected to the optical path by the first optical switch and the second optical switch.

3. The phase modulation apparatus of claim 1, wherein the control unit includes:

a phase modulation data memory for storing phase modulation data having N values;

a voltage generating unit for generating N fixed voltages corresponding to the N values of the phase modulation data, and for supplying the N fixed voltages to the N phase modulators, respectively; and a switching unit for reading the phase modulation data stored in the phase modulation data memory, and outputting the switching signal for selecting one of the N phase modulators, to which the voltage corresponding to a value of the phase modulation data read is supplied, to the first optical switch and the second optical switch.

4. A phase modulation apparatus comprising:

N phase modulators (N: an integer equal to or greater than 2) which are connected serially to an optical path for serially performing a random phase modulation on a photon signal; and a control unit for generating N voltages to the N phase modulators so that a sum of the N voltages applied to the N phase modulators becomes a voltage corresponding to a phase modulation of the photon signal, and supplying the N voltages to the N phase modulators.

5. The phase modulation apparatus of claim 4, wherein the control unit includes:

a phase modulation data memory for storing phase modulation data; and a voltage generating unit for generating N equal voltages (V/N) by equally dividing a voltage V, which corresponds to the phase modulation data stored in the phase modulation data memory, by N, and supplying the N equal voltages (V/N) generated to the N phase modulators, respectively.

6. A phase modulation method for serially performing a random phase modulation on a first photon signal and a second photon signal, the phase modulation method comprising:

a first modulation step for phase modulating the first photon signal by a first phase modulator; and a second modulation step for switching an optical path where the photon signal flows and for phase modulating the second photon signal by a second phase modulator before the first modulation step terminates.

7. A phase modulation method for serially performing a random phase modulation on a photon signal by a predetermined amount by a first phase modulator and a second phase modulator, the phase modulation method comprising:

a voltage generating step for generating a first voltage and a second voltage, a sum of which are equal to a voltage corresponding to the phase modulation by the predetermined amount and whose rise time and fall time are shorter than a rise time and a fall time required for generating the voltage corresponding to the phase modulation by the predetermined amount;

a first modulation step for phase modulating the photon signal by the first phase modulator with supplying the first voltage generated by the voltage generating step to the first phase modulator; and a second modulation step for phase modulating the photon signal, which is phase modulated by the first modulation step, by the second phase modulator with supplying the second voltage generated by the voltage generating step to the second phase modulator, and wherein the phase modulation method performs the phase modulation on the photon signal by the predetermined amount with performing both the first modulation step and the second modulation step.

8. A phase modulation apparatus of quantum cryptography comprising:

N phase modulators (N: an integer equal to or greater than 2) for performing a phase modulation on an optical signal which flows through an optical path;

a first optical switch and a second optical switch for selectively connecting one of the N phase modulators which are placed in parallel to the optical path; and a control unit for outputting a switching signal to the first optical switch and the second optical switch and making the one of the N phase modulators connect to the optical path.

9. A phase modulation apparatus of quantum cryptography comprising:

N phase modulators (N: an integer equal to or greater than 2) which are connected serially to an optical path; and a control unit for generating N voltages to the N phase modulators so that a sum of the N voltages applied to the N phase modulators becomes a voltage corresponding to a phase modulation of an optical signal, and supplying the N voltages to the N phase modulators.

10. A phase modulation method of quantum cryptography for serially performing a phase modulation on a first optical signal and a second optical signal, the phase modulation method of quantum cryptography comprising:

a first modulation step for phase modulating the first optical signal by a first phase modulator; and a second modulation step for switching an optical path where the optical signal flows and for phase modulating the second optical signal by a second phase modulator before the first modulation step terminates.

11. A phase modulation method of quantum cryptography for performing a phase modulation on an optical signal by a predetermined amount by a first phase modulator and a second phase modulator, the phase modulation method of quantum cryptography comprising:

a voltage generating step for generating a first voltage and a second voltage, a sum of which are equal to a voltage corresponding to the phase modulation by the predetermined amount and whose rise time and fall time are shorter than a rise time and a fall time required for generating the voltage corresponding to the phase modulation by the predetermined amount;

a first modulation step for phase modulating the optical signal by the first phase modulator with supplying the first voltage generated by the voltage generating step to the first phase modulator; and a second modulation step for phase modulating the optical signal, which is phase modulated by the first modulation step, by the second phase modulator with supplying the second voltage generated by the voltage generating step to the second phase modulator, and wherein the phase modulation method performs the phase modulation on the optical signal by the predetermined amount with performing both the first modulation step and the second modulation step.

* * * * *